(12) United States Patent
Ashton et al.

(10) Patent No.: US 8,668,858 B2
(45) Date of Patent: Mar. 11, 2014

(54) METHOD FOR MANUFACTURING A REINFORCED PANEL OF COMPOSITE MATERIAL

(75) Inventors: Larry J. Ashton, Mapleton, UT (US); Michael G. Allman, Spanish Fork, UT (US); Troy L. White, Goshen, UT (US); Benko S. Ta'ala, Elk Ridge, UT (US)

(73) Assignee: Spectrum Aeronautical, LLC, Carlsbad, CA (US)

( * ) Notice: Subject to any disclaimer, the term of this patent is extended or adjusted under 35 U.S.C. 154(b) by 0 days.

(21) Appl. No.: 11/855,349

(22) Filed: Sep. 14, 2007

(65) Prior Publication Data
US 2009/0072429 A1    Mar. 19, 2009

(51) Int. Cl.
*B29C 65/00*    (2006.01)

(52) U.S. Cl.
USPC ............................ 264/258; 264/257; 264/152

(58) Field of Classification Search
USPC .......................................... 264/257, 258, 152
See application file for complete search history.

(56) References Cited

U.S. PATENT DOCUMENTS

| | | | |
|---|---|---|---|
| 2,319,675 A | | 5/1943 | Grinter |
| 2,413,737 A | | 1/1947 | Weaver |
| 5,158,733 A | * | 10/1992 | Trimble ........................ 264/258 |
| 5,580,502 A | * | 12/1996 | Forster et al. ................ 264/46.5 |
| 5,707,576 A | * | 1/1998 | Asher ........................... 264/258 |
| 6,171,696 B1 | * | 1/2001 | Takemura et al. ............ 428/357 |
| 6,440,566 B1 | | 8/2002 | Maligie et al. |
| 6,482,497 B1 | | 11/2002 | Kay et al. |
| 6,649,006 B2 | * | 11/2003 | Benson et al. ................ 156/245 |
| 6,743,504 B1 | | 6/2004 | Allen et al. |
| 6,889,937 B2 | | 5/2005 | Simpson et al. |
| 6,919,118 B2 | | 7/2005 | Bompard et al. |
| 7,625,618 B1 | * | 12/2009 | Allen et al. ................ 428/36.91 |
| 2002/0148553 A1 | * | 10/2002 | Campbell, Jr. ................ 156/211 |
| 2003/0186038 A1 | | 10/2003 | Ashton et al. |
| 2004/0070108 A1 | | 4/2004 | Simpson et al. |
| 2004/0079838 A1 | | 4/2004 | Simpson et al. |
| 2005/0211082 A1 | * | 9/2005 | Angeloni et al. .................... 87/3 |
| 2005/0211843 A1 | | 9/2005 | Simpson et al. |
| 2006/0231199 A1 | | 10/2006 | Weng et al. |
| 2006/0249626 A1 | * | 11/2006 | Simpson et al. ........... 244/123.1 |
| 2007/0132140 A1 | * | 6/2007 | Wu ................................ 264/257 |
| 2007/0175031 A1 | | 8/2007 | Pham et al. |

OTHER PUBLICATIONS

James Hardie International Finance BV., Hardipanel. JH91509PSL-P1/2 [Brochure], Fig. 1, Fig 2, "Caulk Joing", Dec. 2005.

* cited by examiner

*Primary Examiner* — Amjad Abraham
(74) *Attorney, Agent, or Firm* — Nydegger & Associates

(57) ABSTRACT

A method for manufacturing rigid panels made of a composite material requires a caul sheet having a smooth surface that is formed with a plurality of grooves. A first layer of the composite material is laid on the caul sheet, and is cut to create flaps that extend into the respective grooves. Strips of composite material are then placed along the edges of the groove to extend and overlap each other in the groove. Next, a unidirectional ply is placed along the length of the groove, and this combination is then covered with a second layer of the composite material. Together, the combination of the first and second layers, the strips and the unidirectional ply are co-cured to create a rigid panel with integral stiffening members.

8 Claims, 3 Drawing Sheets

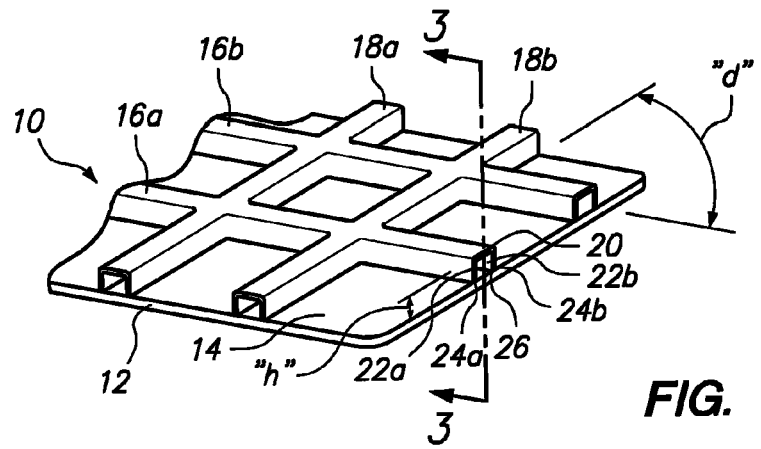
FIG. 1
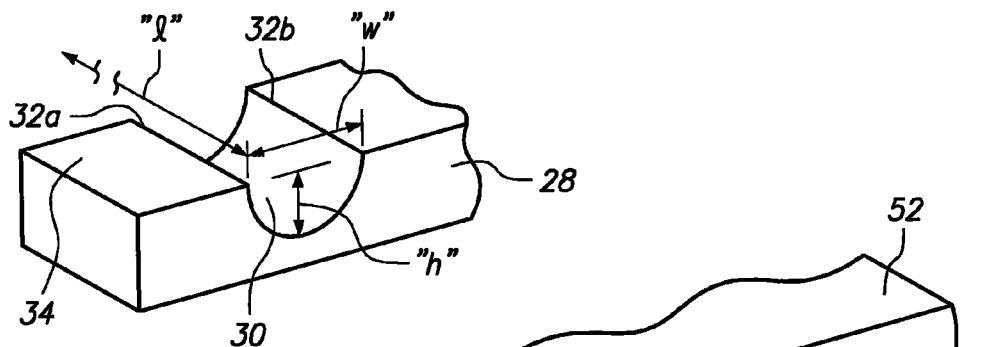
FIG. 2
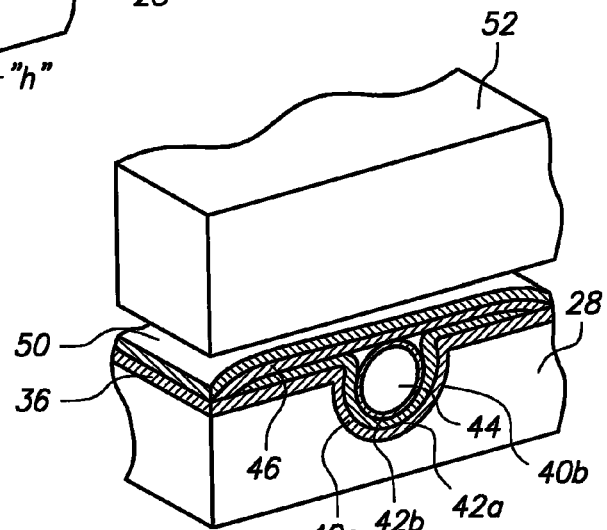
FIG. 4
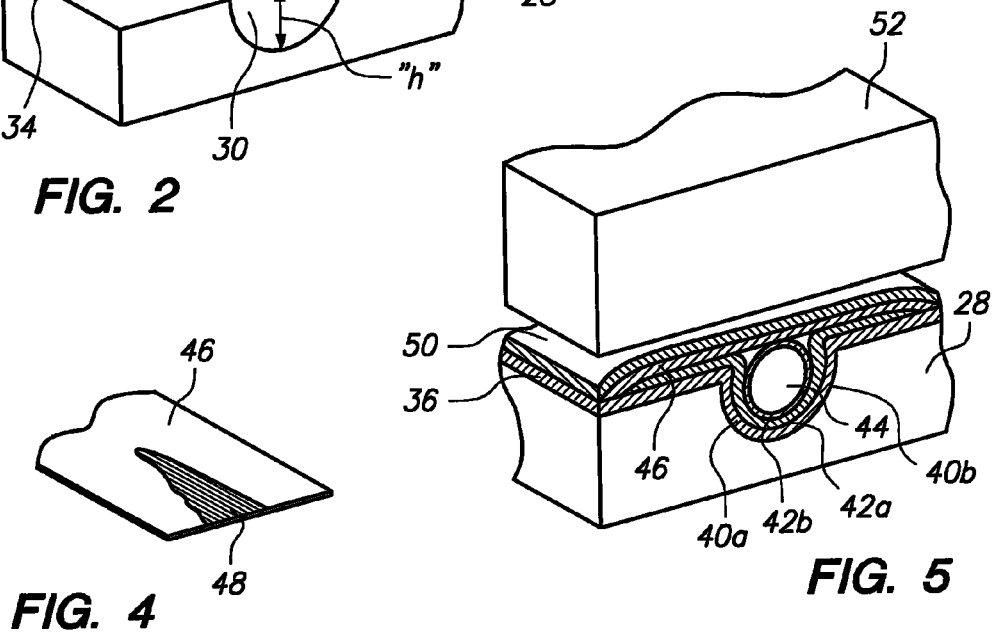
FIG. 5
FIG. 6

METHOD FOR MANUFACTURING A REINFORCED PANEL OF COMPOSITE MATERIAL

FIELD OF THE INVENTION

The present invention pertains generally to stiff and rigid panels that are made of composite materials. More particularly, the present invention pertains to rigid panels having stiffening members made of the same composite material that is used for the manufacture of the panel. The present invention is particularly, but not exclusively, useful as a reinforced panel and its methods of manufacture, wherein the stiffening members are structural continuations of the base panel.

BACKGROUND OF THE INVENTION

The use of composite materials for the manufacture of structural components has expanded considerably over the past years. In particular, composite materials made of carbon fibers and epoxy resins have been successfully used for the manufacture of various types of vehicles (e.g. cars, boats and airplanes). In part, this has happened because these materials are relatively light-weight, and they exhibit high strength in both tension and compression. They are also quite damage tolerant and resistant to puncture. Further, they inhibit water migration. Despite these many virtues, when composite materials are made into panels, and they do not have proper support, they are susceptible to buckling and can be floppy.

From a structural perspective, it is well known that the ability of a beam to resist being bent can be enhanced by adding material to the beam in its plane of bending. An I-beam is a good example of this and, in many respects, a panel is essentially no different. For instance, a panel exhibits a very high resistance to bending when forces are directed against the panel only in the plane where its material is located. On the other hand, a panel tends to buckle and flop when it is subjected to forces that are directed transverse to the plane of the panel. In this latter case, there is no material in the panel that can effectively react to the forces. A solution here is to reinforce the panel by positioning reactive material at a distance from the plane of the panel.

Early attempts to reinforce and stiffen composite material panels have typically involved using separate layers of the material. More specifically, these layers are held and distanced from each other by a honeycomb construction. While generally effective, these reinforced composite material panels are susceptible to separation between the layers of composite material and the honeycomb construction. As is well known, such separations weaken the panel. It also happens that such panels can become porous and, thus, be susceptible to moisture migration through the structure. In the case of vehicles, this moisture migration can lead to the corrosion of other structural components that can adversely affect the operation of the vehicle.

In light of the above, it is an object of the present invention to provide a reinforced panel that is made of a composite material, as well as its method of manufacture, wherein the panel is rigid and stiff. Another object of the present invention is to provide a reinforced panel and its method of manufacture that resists material separations which otherwise diminish the structural strength of the panel. Still another object of the present invention is to provide a reinforced panel and its method of manufacture, wherein the panel is non-porous and effectively prevents water migration in the panel. Yet another object of the present invention is to provide a method for manufacturing a reinforce panel that is made entirely of a composite material, wherein the method is easy to implement and is cost effective.

SUMMARY OF THE INVENTION

In accordance with the present invention, a method for manufacturing a reinforced panel requires the use of a caul sheet. Importantly, the caul sheet needs to be formed with a surface that is a mirror-image (i.e. a negative) of a desired surface of the reinforced panel. For the present invention, the caul sheet will have a generally smooth surface that may be either curved or flat, and the surface will be formed with a plurality of generally straight grooves. More specifically, each groove will have a first edge and a second edge. Each edge will also have a length "l" and a depth "h". As intended for the present invention, a first plurality of substantially parallel grooves is oriented on the surface of the caul sheet transverse to a second plurality of substantially parallel grooves. With this orientation, the grooves establish an iso-grid for the stiffening members of the reinforced panel.

For the manufacture of the reinforced panel, a first layer of composite material is placed over the surface of the caul sheet. Initially, this first layer spans (i.e. extends over) the grooves on the caul sheet. Once in place, however, the first layer is then cut along the length "l" of each groove, at its mid-span. The result is that flaps are created in the first layer which extend from opposite edges of the respective grooves. These flaps are then folded into the groove along the first and second edges of the groove.

After the flaps have been folded into each groove on the caul sheet, a strip of composite material is positioned along the first edge of the groove. This strip extends into the groove from the surface of the caul sheet. The strip also extends over the flap that was previously folded into the groove. Importantly, the strip needs to extend beyond the flap and, more specifically, it needs to extend beyond the midpoint at the bottom of the groove. Another strip of composite material is then positioned along the second edge of each groove. Like the first strip, this second strip extends into the groove from the surface of the caul sheet. It, too, extends over and beyond the flap that was previously folded into the groove. Most importantly, this second strip needs to extend beyond the midpoint at the bottom of the groove until it overlaps the first strip. A nylon tube is then placed in each groove, along its entire length "l".

A unidirectional ply (i.e. a ply in which all of its tows are substantially parallel to one another) is laid over the nylon tube that is in place in the groove. Importantly, the placement of the unidirectional ply is such that its tows are aligned along the length of the groove. Further, the unidirectional ply is laid so it will be in contact with the strips that have already been respectively positioned along the opposite edges of the groove. A second layer of the composite material is then placed over the first layer of composite material on the caul sheet. This placement also covers the unidirectional ply. Thus, the unidirectional ply, the nylon tube and the strips are all located between the first and second layers of composite material. The combination of these composite material components is then ready to be co-cured.

For an alternate embodiment of the present invention, an additional unidirectional ply is employed. The purpose here is to position two different unidirectional plies at substantially the distance "h" from each other, to alternatively resist the tension forces that are generated during a bending of the reinforced panel. For the manufacture of this embodiment a base unidirectional ply is placed along the bottom of the groove. This placement can be done before the first layer of composite material is placed over the surface of the caul sheet. In this case, after the flaps have been created, they are each folded into the groove to overlap the pre-placed, base unidirectional ply. Alternatively, the flaps can be created first and folded into the groove as disclosed above. The base unidirectional ply is then placed into the bottom of the groove to overlap the previously folded flaps. In either case, the strip, the nylon tube, and the unidirectional ply in the first layer are subsequently constructed as disclosed above.

During the curing process, the combination of composite material components is positioned between the caul sheet and a base member. They are then subjected to a pressure in a range between approximately 30 psi and approximately 100 psi. At the same time, the nylon tube that is located in the grooves of the caul sheet is pressurized with a pressure in a range between approximately 30 psi and approximately 100 psi. While these respective pressures are maintained, the combination of composite material components is cured at a temperature in a range between 200° F. and 300° F. This curing continues for a period of time lasting approximately 120 minutes. When the curing process has been completed, the caul sheet and base member are removed, and the reinforced panel has been manufactured.

Some additional aspects of the composite materials that are used for the present invention need to be noted. First, the composite materials are preferably made of carbon fibers in an epoxy resin. More specifically, these fibers are combined into what is commonly referred to as "tows." In the case of the unidirectional ply, disclosed above, the tows are aligned substantially parallel to one another. On the other hand, the tows in other composite material components for the present invention, such as the first and second layers, and the strips, are made with respective pluralities of tows that are oriented transverse to each other. The orientation angle between the pluralities of tows can be varied according to the desired results. In any event, the tows are typically oriented to provide a maximum practicable tensile strength in a desired range of directions.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of a reinforced panel made of a composite material in accordance with the present invention;

FIG. 2 is a perspective view of a portion of a caul sheet used for manufacturing a reinforced panel in accordance with the present invention;

FIG. 4 is a perspective view of a unidirectional ply, with portions broken away for clarity, for use in the step shown in FIG. 3E;

FIG. 5 is a perspective view of an assembly of composite material components ready to be cured;

FIG. 6 is a perspective view, in cross-section, of a stiffening member for a reinforced panel made of composite material in accordance with the present invention as would be seen along the line 3-3 in FIG. 1;

DESCRIPTION OF THE PREFERRED EMBODIMENTS

Figure 3A:
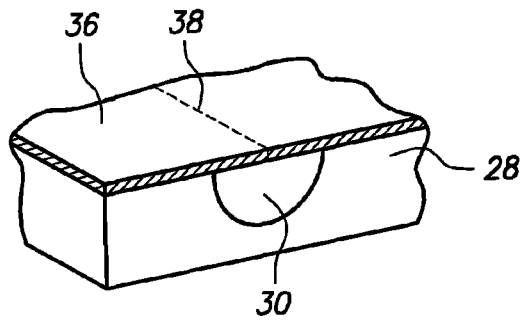
FIGS. 3A-3F, collectively, present a series of perspective views, in cross-section as seen along the line 3-3 in FIG. 1, showing the sequential steps for laying down layers of composite material on a caul sheet during the manufacture of a reinforced panel in accordance with the present invention.

Referring initially to FIG. 1, a reinforced panel that is manufactured in accordance with the present invention is shown and is generally designated 10. In FIG. 1 it is seen that the reinforced panel 10 includes a base layer 12 having a surface 14. For purposes of the present invention, the surface 14 may be either curved or flat. Further, FIG. 1 shows that the panel 10 includes a first plurality of stiffening members 16, of which the stiffening members 16a and 16b are only exemplary. Also, FIG. 1 shows that the panel 10 includes a second plurality of stiffening members 18, of which the stiffening members 18a and 18b are also only exemplary. As shown, the stiffening members 16 of the first plurality are substantially parallel to each other. Likewise, the stiffening members 18 of the second plurality are also substantially parallel to each other. As shown, the stiffening members 16 are oriented transverse to the stiffening members 18 with an angle "α" between them. When the angle "α" is a right angle, the pluralities of stiffening members 16, 18 form an orthogrid. When the angle "α" is an acute angle, the pluralities of stiffening members 16, 18 form an isogrid.

Still referring to FIG. 1, and referring specifically to the stiffening member 16a, it is to be appreciated that all of the stiffening members 16, 18 will each include a base portion 20, and that this base portion 20 is located at a distance "h" from the surface 14 of base layer 12. Further, each stiffening member 16,18 is formed with a pair of opposed legs 22a and 22b that extend from the base portion 20 to a respective edge 24a and 24b. These legs 22a and 22b are respectively affixed to the surface 14 of base layer 12, and they define a channel 26 between them.

In FIG. 2 a portion of a caul sheet 28 is shown. As will be appreciated by the skilled artisan, the entire caul sheet 28 may be quite extensive and, as implied above, can be any of several configurations. The portion of caul sheet 28 shown in FIG. 2 is, however, sufficient for purposes of disclosure. With this in mind, the caul sheet 28 is shown formed with a groove 30 having opposed edges 32a and 32b that respectively mark a transition from a surface 34 of the caul sheet 28 to the groove 30. As mentioned above, in actuality there will most likely be several such grooves 30. FIG. 2 also shows that the groove 30 has a width "w" and a depth "h". Further, FIG. 2 indicates the groove 30 has a length "l" that is determined by the requirements of the caul sheet 28.

Figure 3B:
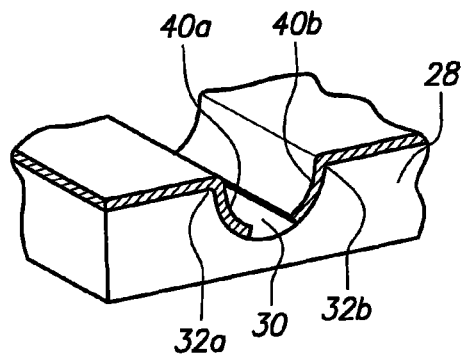

Referring now to FIGS. 3A-3F, the sequential steps for the manufacture of a reinforced panel 10 are shown in the order they are to be performed. Beginning with FIG. 3A, a first layer 36 of composite material is fabricated to cover the surface 34 of caul sheet 28. Initially, the first layer 36 spans the groove 30. Once the first layer 36 has been established, however, it is cut along the dashed line 38. More specifically, this cut is made at the mid-span of the groove 30, and along the entire length "l" of the groove 30. The result is the creation of the flaps 40a and 40b shown in FIG. 3B. As shown in FIG. 3B, both of the flaps 40a and 40b are folded over the respective edges 32a and 32b and down into the groove 30.

Figure 3C:
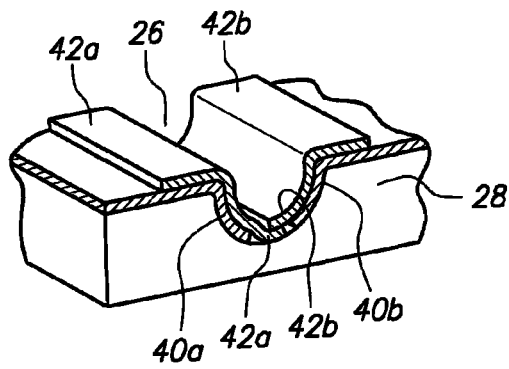
Figure 3D:
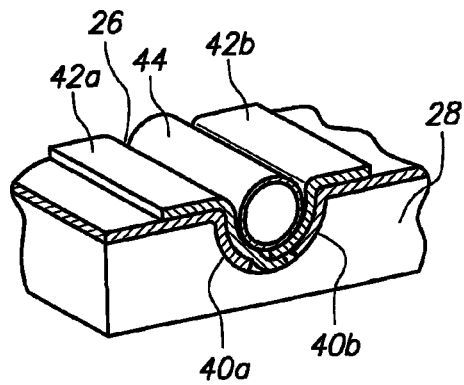
Figure 3E:
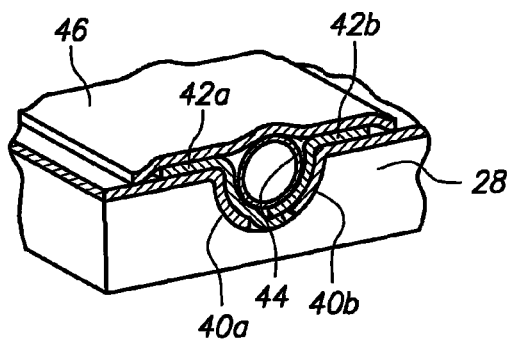

FIG. 3C shows that after the flaps 40a and 40b have been folded into the groove 30, strips 42a and 42b of composite material are positioned along the respective edges 32a and 32b of the groove 30. The strips 42a and 42b are then folded over the flaps 40a and 40b. More specifically, when so folded, each of the strips 42a and 42b extend into the groove 30, and past its mid-point at the bottom thereof. The import here is that the ends of the strips 42a and 42b overlap each other. Next, as indicated in FIG. 3D, a nylon tube 44 is then placed in the channel 26 that is created in the groove 30. It will be appreciated that a ply (not shown) can be added around the tube 44 to provide extra strength.

Figure 3F:
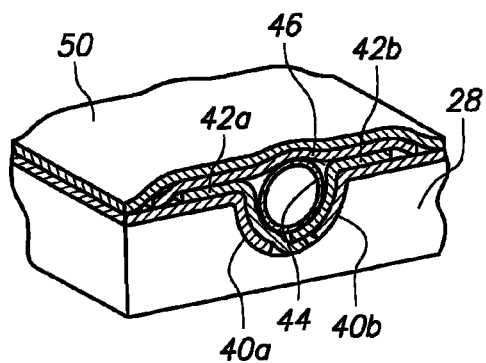

After the nylon tube 44 has been placed in channel 26, a unidirectional ply 46 is laid on top of the tube 44 to cross the groove 30 substantially as shown. As intended for the present invention, this unidirectional ply 46 is made of composite material and includes a great number of tows 48 that are all aligned mutually parallel to each other (see FIG. 4). Importantly, when the ply 46 is laid down, the tows 48 are aligned along the length "l" of the groove 30. As shown in FIG. 3F, a second layer 50 of composite material is then laid down over the ply 46. Specifically, in addition to covering the ply 46, this second layer 50 covers the entire caul sheet 28. The result is a combination of composite material components (i.e. first layer 36, strips 42a and 42b, ply 46, and second layer 50) that will be co-cured to create the reinforced panel 10.

FIG. 5 shows that once the combination of composite material components (i.e. first layer 36, strips 42a and 42b, ply 46, and second layer 50) has been assembled, it is positioned between the caul sheet 28 and a base member 52. It is then pressed between the caul sheet 28 and a base member 52 with a pressure in a range between approximately 30 psi and approximately 100 psi. Simultaneously the nylon tube 44 that is in the channel 26 between the ply 46 and the strips 42a and 42, is pressurized with a pressure in a range between approximately 30 psi and approximately 100 psi. With these pressures applied, the combination of composite material components (i.e. first layer 36, strips 42a and 42b, ply 46, and second layer 50) is cured at a temperature in a range between 200° F. and 300° F. for a period of time lasting approximately 120 minutes. At this point it is to be noted that, after curing, the nylon tube 44 remains with the panel 10. It is also noted that whereas the ply 46 is a unidirectional composite material (i.e. its tows 48 are mutually parallel) the composite material used for first layer 36, strips 42a and 42b, as well as the second layer 50 will typically not be unidirectional. Instead, they will respectively have first and second pluralities of tows that run transverse to each other (e.g. at 90°).

FIG. 6 shows a part of the reinforced panel 10 after its manufacture. As shown in FIG. 6, and best appreciated with cross reference to FIG. 5, base layer 12 results from the co-curing of the first layer 36 with the second layer 50. At the same time, the co-curing of the strips 42a and 42b, with the flaps 40a and 40b, create the stiffening member 16. Similarly, the unidirectional ply 46 is co-cured with the second layer 50 to establish an integral structure for the ply 46. The result is a reinforced panel 10 having a smooth surface 54 that is suitable for use in several applications. As envisioned for the present invention, the surface 54 will be used to establish the external skin for an aircraft fuselage (not shown).

Figure 7A:
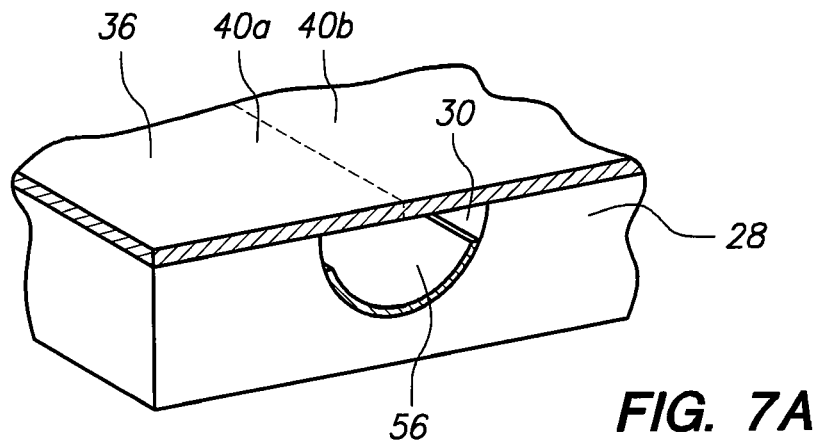
FIGS. 7A-7B are perspective views, in cross-section as seen along the line 3-3 in FIG. 1, showing steps for employing a base unidirectional ply during the manufacture of an alternate embodiment of a reinforced panel in accordance with the present invention.

For an alternate embodiment of the reinforced panel 10, and a method for its manufacture, FIG. 7A indicates that a base unidirectional ply 56 is positioned in the bottom of groove 30 on the caul sheet 28. In all of its important respects, the base unidirectional ply 56 is structurally similar to the unidirectional ply 46 disclosed above. Also, similar to the unidirectional ply 46, the base unidirectional ply 56 is positioned in the groove 30 with its tows 48 substantially aligned along the length "l" of the groove 30.

Figure 7B:
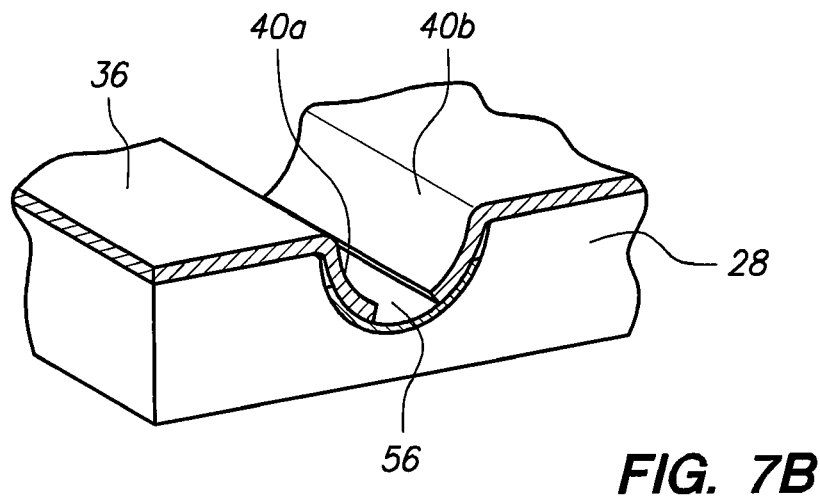

With the base unidirectional ply 56 positioned on caul sheet 28 as shown in FIG. 7A, the flaps 40a and 40b are folded into the groove 30 to overlap the base unidirectional ply 56 as shown in FIG. 7B. It will be appreciated by the skilled artisan that placement of the base unidirectional ply 56 in the groove 30, and the folding of the flaps 40a and 40b into the groove 30 can be reversed (i.e. flaps 40a,b are folded into the groove 30, and the base unidirectional ply 56 is then placed in the groove 30 to overlap the flaps 40a, b). In either case, the placement of strip 42a, b, the placement of nylon tube 44, and the placement of the unidirectional ply 46 in the first layer 36 are all subsequently constructed as disclosed above. The curing process is also as disclosed above.

Figure 8:
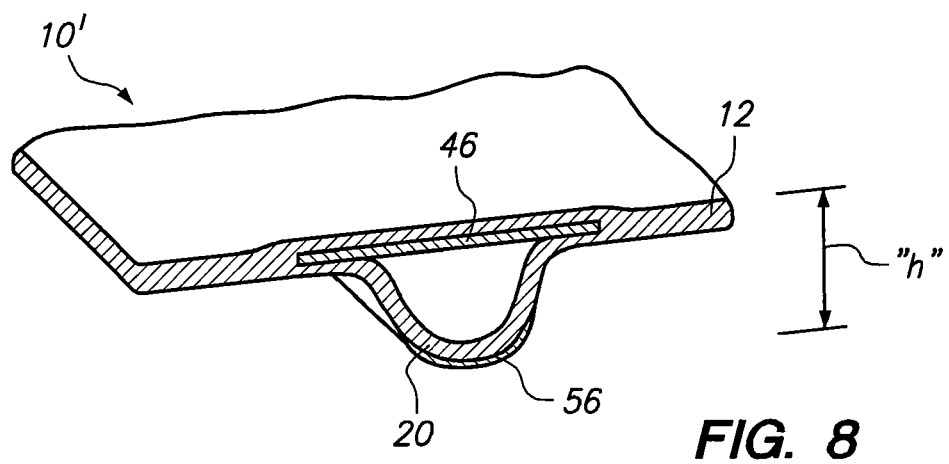
FIG. 8 is a perspective view, in cross-section, of an alternate embodiment of a stiffening member for a reinforced panel made of composite material in accordance with the present invention as would be seen along the line 3-3 in FIG. 1.

The consequence of the alternative construction noted above is a reinforced panel 10' generally shown in FIG. 8. Importantly, for the reinforced panel 10' of the present invention, the base unidirectional ply 56 in the base portion 20 of the panel 10' is substantially at a distance "h" from the unidirectional ply 46 located in the base layer 12. Structurally, the consequence of this construction is that both the unidirectional ply 46 and the base unidirectional ply 56 are positioned to alternatively resist tension forces that are generated during a bending of the reinforced panel 10'. Importantly, this resistance is provided against bend forces that may be experienced in either of opposite directions.

While the particular Method for Manufacturing a Reinforced Panel of Composite Material as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for manufacturing a stiffening member to reinforce a panel made of a composite material which comprises the steps of:

providing a caul sheet having a surface formed with a groove, wherein the groove has a first edge, a second edge and a predetermined length "l" and wherein the groove has a bottom and establishes a mid-point at the bottom of the groove;

fabricating a first layer of the composite material to cover the surface of the caul sheet and to span the groove;

covering the surface of the caul sheet with the first layer;

cutting the first layer at mid-span along the length "l" of the groove to create a pair of opposed flaps;

folding the flaps of the first layer, created during the cutting step, into the groove along the respective first and second edges of the groove to create a gap between the flaps in the groove;

positioning a first strip of the composite material along the first edge of the groove to extend from the first layer and into the groove to overlay the gap and extend past the mid-point of the groove to a first strip end between the mid-point of the groove and the second edge of the groove;

positioning a second strip of the composite material along the second edge of the groove to extend from the first layer and into the groove, and extend past the mid-point of the groove to a second strip end between the midpoint of the groove and the first edge of the groove to overlap the first strip and to therewith create a continuation of the first layer;

laying a unidirectional ply on the surface of the caul sheet, wherein the unidirectional ply has a plurality of substantially parallel tows aligned along the length of the groove and substantially parallel to the length of the groove, and wherein the unidirectional ply is in contact with the first and second strips to establish a channel between the unidirectional ply and the continuation;

placing a nylon tube in the channel between the unidirectional ply and the continuation;

fabricating a second layer of the composite material to cover the first layer with the channel therebetween to configure the stiffening member for reinforcement of the panel; and co-curing the caul sheet, the unidirectional ply, the nylon tube, the first layer of composite material, the second layer of composite material, the first strip of composite material, and the second strip of composite material to form the stiffening member.

2. A method as recited in claim 1 further comprising the step of pressing the panel between the caul sheet and a base member with a pressure in a range between 30 psi and 100 psi.

3. A method as recited in claim 2 further comprising the step of pressurizing the nylon tube during the pressing step with a pressure in a range between 30 psi and 100 psi.

4. A method as recited in claim 3 wherein the co-curing step is accomplished at a temperature in a range between 200° F. and 300° F. for a period of time lasting approximately 120 minutes.

5. A method as recited in claim 1 wherein the composite material is made of carbon fibers and an epoxy resin.

6. A method as recited in claim 1 further comprising the step of positioning a base unidirectional ply in the groove, wherein the base unidirectional ply has a plurality of substantially parallel tows, and wherein the parallel tows are aligned along the length of the groove and substantially parallel to the length of the groove.

7. A method as recited in claim 6 wherein the step of positioning the base unidirectional ply is accomplished prior to the fabricating step for the first layer.

8. A method as recited in claim 1 wherein the step of positioning a second strip of the composite material covers the groove with a two layer, substantially uniform thickness of composite material.

* * * * *